US010044711B2

(12) United States Patent
Yoon

(10) Patent No.: US 10,044,711 B2
(45) Date of Patent: Aug. 7, 2018

(54) USER MIDDLE FINGER—WRIST BIOMETRIC AUTHENTICATION APPARATUS

(71) Applicant: Electronics and Telecommunications Research Institute, Daejeon (KR)

(72) Inventor: Ho-Sub Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 53 days.

(21) Appl. No.: 15/076,767

(22) Filed: Mar. 22, 2016

(65) Prior Publication Data

US 2016/0373438 A1    Dec. 22, 2016

(30) Foreign Application Priority Data

Jun. 17, 2015    (KR) .................. 10-2015-0085598

(51) Int. Cl.
*G06F 7/04*    (2006.01)
*G06F 15/16*    (2006.01)
(Continued)

(52) U.S. Cl.
CPC ...... *H04L 63/0861* (2013.01); *G06K 9/00382* (2013.01); *H04W 12/06* (2013.01); *G06K 2009/00395* (2013.01); *H04W 88/02* (2013.01)

(58) Field of Classification Search
CPC ............ H04L 63/0861; G06K 9/00382; G06K 2009/00395; H04W 12/06
(Continued)

(56) References Cited

U.S. PATENT DOCUMENTS 7,769,209 B2 * 8/2010 Komura ............. G06K 9/00885
340/5.53
8,085,992 B1 * 12/2011 Sahin ................. G06K 9/00013
382/115
(Continued)

FOREIGN PATENT DOCUMENTS

KR    1020060057085 A    5/2006
KR    1020060093444 A    8/2006
(Continued)

*Primary Examiner* — Dant B Shaifer Harriman
(74) *Attorney, Agent, or Firm* — William Park & Associates Ltd.

(57) ABSTRACT

Disclosed herein is a user authentication apparatus that captures images of the back and/or the palm of a hand using both a mobile camera, such as a smart phone or a smart pad, and a high-resolution stationary camera embedded in a PC, extracts various types of biometric information from the captured images, registers the extracted biometric information, and authenticates a new image when the new image is input. The user authentication apparatus includes a hand area detection unit for detecting a hand area from an input hand image, a hand area normalization unit for binarizing the detected hand area and normalizing the binarized hand area, a hand biometric information extraction unit for extracting unique hand biometric information from the normalized hand area, and a hand biometric information registration and authentication unit for registering the hand biometric information and authenticating the corresponding user based on the hand biometric information.

10 Claims, 25 Drawing Sheets

(51) Int. Cl.
 *G06F 17/30* (2006.01)
 *H04L 29/06* (2006.01)
 *G06K 9/00* (2006.01)
 *H04W 12/06* (2009.01)
 *H04W 88/02* (2009.01)

(58) Field of Classification Search
 USPC .............................................................. 726/7
 See application file for complete search history.

(56) References Cited

U.S. PATENT DOCUMENTS

| | | | | |
|---|---|---|---|---|
| 2007/0003111 A1* | 1/2007 | Awatsu | .................. | G06F 21/32 382/115 |
| 2007/0022303 A1* | 1/2007 | Awatsu | .................. | G06F 21/32 713/186 |
| 2007/0249540 A1* | 10/2007 | Papathanassiu | ....... | A61K 38/05 514/1.9 |
| 2008/0115208 A1* | 5/2008 | Lee | .......................... | G06F 21/31 726/19 |
| 2008/0226136 A1 | 9/2008 | Takaku et al. | | |
| 2010/0040265 A1* | 2/2010 | Iizuka | ................ | G06K 9/00885 382/128 |
| 2010/0127827 A1* | 5/2010 | Watanabe | .......... | G06K 9/00342 340/5.83 |
| 2012/0032781 A1 | 2/2012 | Moon et al. | | |
| 2012/0155716 A1 | 6/2012 | Kim | | |
| 2013/0216095 A1* | 8/2013 | Yabuki | ................ | H04L 63/0861 382/103 |
| 2014/0068740 A1* | 3/2014 | LeCun | ................ | H04L 63/0861 726/7 |
| 2014/0347479 A1* | 11/2014 | Givon | ................ | G06K 9/00342 348/143 |
| 2016/0373438 A1* | 12/2016 | Yoon | ................ | H04L 63/0861 |

FOREIGN PATENT DOCUMENTS

KR   1020080025340 A   3/2008
KR      101327939 B1   11/2013

* cited by examiner

USER MIDDLE FINGER—WRIST BIOMETRIC AUTHENTICATION APPARATUS

CROSS REFERENCE TO RELATED APPLICATION

This application claims the benefit of Korean Patent Application No. 10-2015-0085598, filed Jun. 17, 2015, which is hereby incorporated by reference in its entirety into this application.

BACKGROUND OF THE INVENTION

1. Technical Field

The present invention relates generally to a user authentication apparatus and, more particularly, to an apparatus for authenticating the identity of a user by recognizing the shape of the user's hand using a camera installed in a mobile phone or a Personal Computer (PC).

2. Description of the Related Art

As conventional biometric recognition schemes using mobile phones, methods using facial information, fingerprint information, or iris information have been chiefly attempted.

However, facial recognition does not yet yield satisfactory results from the standpoint of accuracy, fingerprint recognition requires special hardware, and iris recognition also requires specific hardware therefor (e.g. a proximity camera, infrared lighting, etc.). Thus, those methods have not yet been realized.

Further, conventional biometric recognition methods include methods using a fingerprint, a vein pattern, voice, a hand shape, the lines in the palm, or the like. However, most conventional methods require the assistance of separate hardware (e.g. a fingerprint scanner, a venous information input device, a hand scanner, a microphone, or the like) for acquiring biometric information. In the case of contact-type sensors, there is no method capable of solving a sanitation problem and a noise problem based on the physical contact required to provide biometric information. Furthermore, when biometric information is forged using false biometric information (e.g. rubber, silicon, gelatin, or the like), security is fatally deteriorated.

To solve this problem, there is required a new type of authentication technology for integrally extracting the biometric information about the hand in a non-contact manner using high-quality cameras embedded in mobile/stationary Information Technology (IT) devices and preventing the forgery of authentication information using the extracted biometric information, thereby realizing a high level of security.

As preceding technology related to the present invention, there are disclosed Korean Patent Application Publication No. 2008-0025340 (entitled "Living Body Guidance Control Method for a Biometrics Authentication Device, and Biometrics Authentication Device"), Korean Patent No. 1327939 (entitled "Biometrics System Using Relative Ratio Information of Finger Geometry Features and the Method Thereof"), and Korean Patent Application Publication No. 2006-0057085 (entitled "Mobile phone and method for identifying user").

SUMMARY OF THE INVENTION

Accordingly, the present invention has been made keeping in mind the above problems occurring in the prior art, and an object of the present invention is to provide an apparatus that captures images of the back and/or the palm of a hand using both a mobile camera, such as a smart phone or a smart pad, and a high-resolution stationary camera embedded in a PC, extracts various types of biometric information from the captured images, registers the extracted biometric information, and authenticates a new image when the new image is input.

In accordance with an aspect of the present invention to accomplish the above object, there is provided a user authentication apparatus including a hand area detection unit for detecting a hand area from an input hand image; a hand area normalization unit for binarizing the detected hand area and normalizing the binarized hand area; a hand biometric information extraction unit for extracting unique hand biometric information from the normalized hand area; and a hand biometric information registration and authentication unit for registering the extracted hand biometric information, and authenticating the corresponding user based on the registered hand biometric information.

The hand area detection unit may detect the area of the hand based on the color of the skin.

The hand area normalization unit may acquire the skin color by sampling a portion of the region around a center point of the detected hand area, binarize the hand area using the acquired skin color, detect major points of the hand from the edge of the binarized hand area, detect the middle finger from the major points of the hand, rotate the image so that the middle finger is located at the center of the image, and define the boundary of a wrist region.

The hand biometric information extraction unit may extract biometric information about the back of the hand and biometric information about the palm of the hand as hand biometric information.

The hand biometric information extraction unit may analyze the skin patterns in the normalized hand area, and may classify an image containing no palm lines as an image of the back of the hand.

The hand biometric information extraction unit may extract, based on the image of the back of the hand, one or more of the contour of the hand, the ratios between the lengths and/or widths of the fingers, the wrist, and the back of the hand, the shapes of nails and the ratios between the lengths and/or widths of the nails, the wrinkle patterns in the knuckles, the position, shape, and distribution of hair on the hand, the position, shape and distribution of spots, the position, shape, and distribution of a skin-color-modified region, and a complete skin-color region forming the hand area, as biometric information about the back of the hand.

The one or more pieces of biometric information about the back of the hand may be combined with respective weights assigned thereto.

The hand biometric information extraction unit may analyze the skin pattern of the normalized hand area, and may classify an image having palm lines as an image of the palm of the hand.

The hand biometric information extraction unit may extract, based on the image of the palm of the hand, one or more of the contour of the hand, ratios between lengths and/or widths of the fingers, the wrist, and the palm of the hand, wrinkle patterns in the knuckles, wrinkle patterns in the wrist, line patterns in a palm line area, and a complete skin-color region forming the hand area, as the biometric information about the palm of the hand.

The one or more pieces of biometric information about the palm of the hand may be combined with respective weights assigned thereto.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
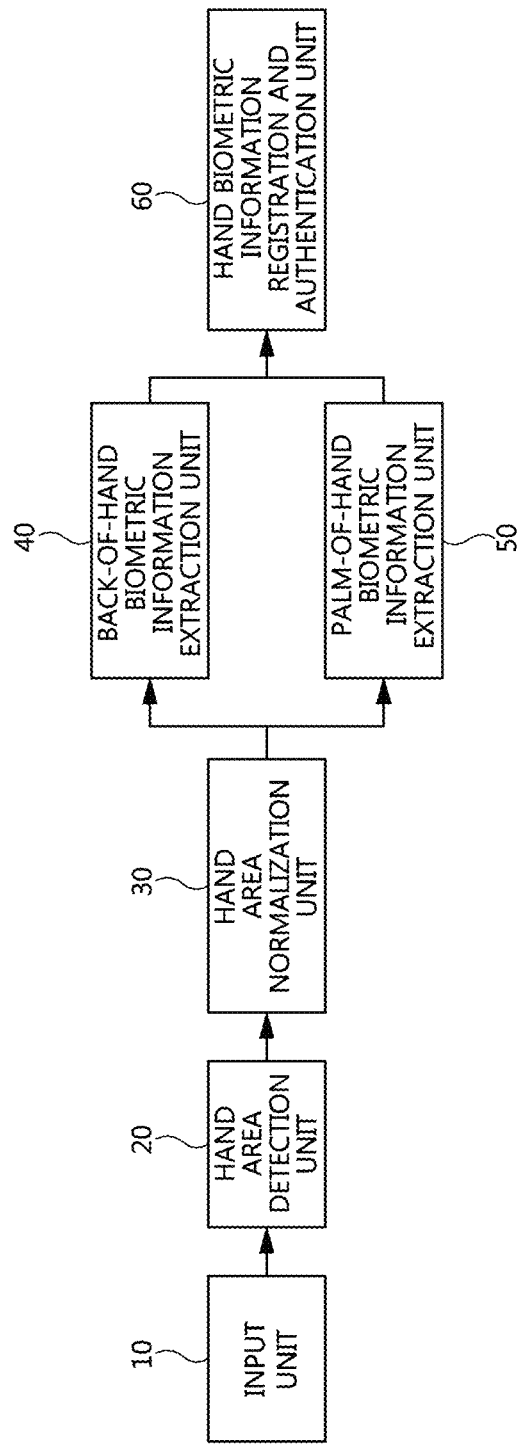
FIG. 1 is a configuration diagram of a user authentication apparatus according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

FIG. 1 is a configuration diagram of a user authentication apparatus according to an embodiment of the present invention.

The user authentication apparatus according to the embodiment of the present invention includes an input unit 10, a hand area detection unit 20, a hand area normalization unit 30, a back-of-hand biometric information extraction unit 40, a palm-of-hand biometric information extraction unit 50, and a hand biometric information registration and authentication unit 60.

The input unit 10 receives a hand image that includes images of the back of the hand and/or the palm of the hand through a camera. The input unit 10 includes a mobile camera, such as a smart phone or a smart pad, and a high-resolution stationary camera embedded in a PC.

The hand area detection unit 20 detects the hand area based on the color of the skin from the hand image received by the input unit 10.

The hand area normalization unit 30 binarizes the detected hand area and normalizes the binarized hand area so as to obtain a more accurate shape of the hand area detected by the hand area detection unit 20.

The back-of-hand biometric information extraction unit 40 separates an image of the back of the hand from the hand image by analyzing a skin pattern in the hand area normalized by the hand area normalization unit 30, and then extracts unique biometric information from the separated image of the back of the hand.

The palm-of-hand biometric information extraction unit 50 separates an image of the palm of the hand from the hand image by analyzing the skin pattern in the hand area normalized by the hand area normalization unit 30, and then extracts unique biometric information from the separated image of the palm of the hand.

The back-of-hand biometric information extraction unit 40 and the palm-of-hand biometric information extraction unit 50 may be collectively designated as a hand biometric information extraction unit.

The hand biometric information registration and authentication unit 60 receives biometric information about the back of the hand and the palm of the hand from the back-of-hand biometric information extraction unit 40 and the palm-of-hand biometric information extraction unit 50, registers the received biometric information, and authenticates the corresponding user based on the registered biometric information about the back and the palm of the hand.

Figure 2:
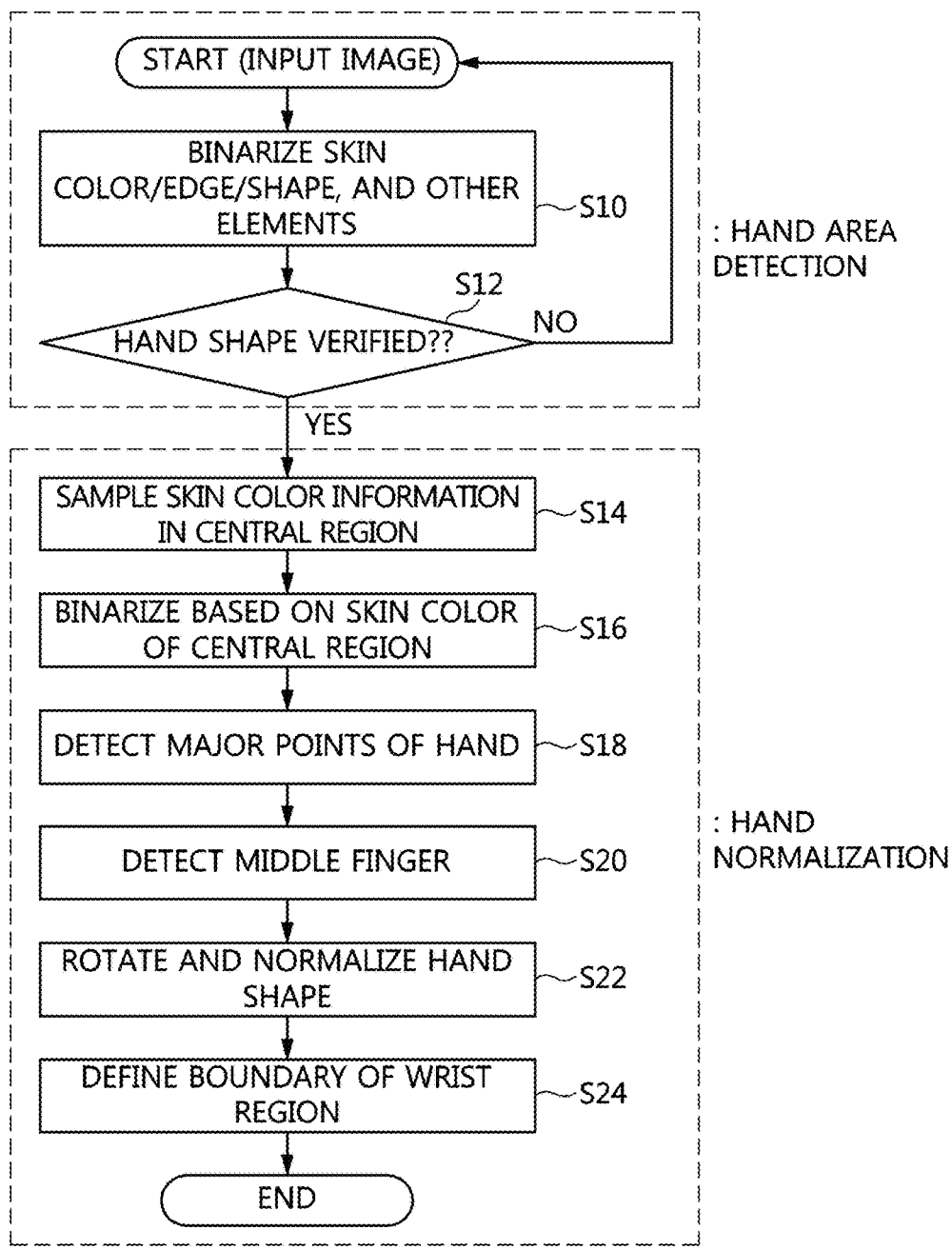
FIG. 2 is a flowchart showing the operation of the hand area detection unit and the hand area normalization unit, shown in FIG. 1.
Figure 3:
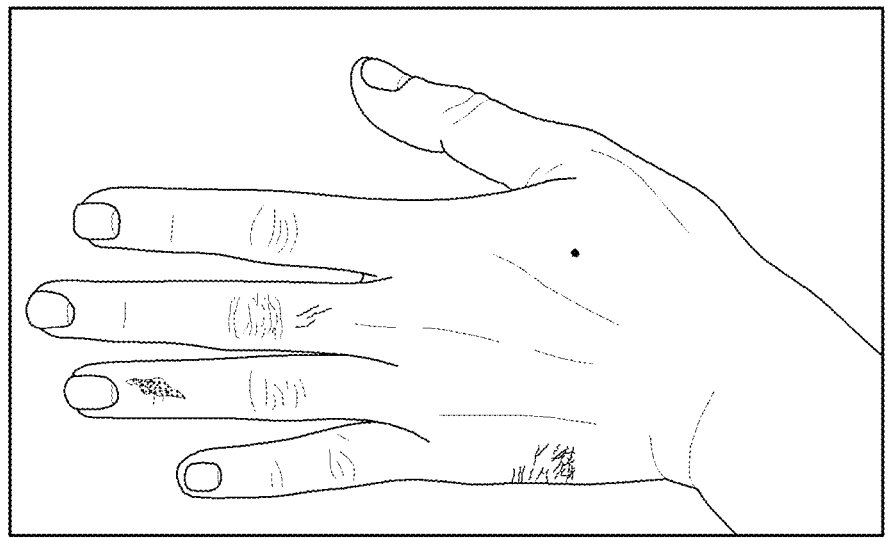
FIGS. 3 to 10 are diagrams employed in the description of FIG. 2.
Figure 4:
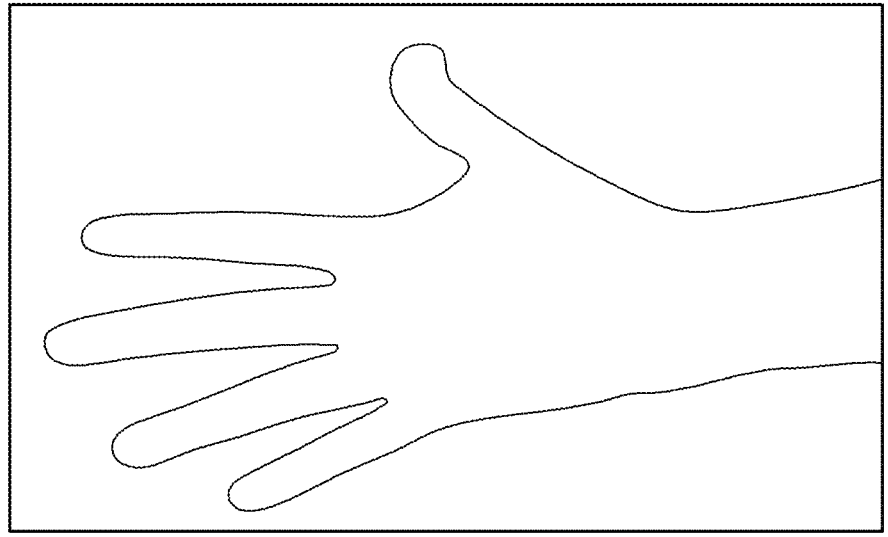
Figure 5:
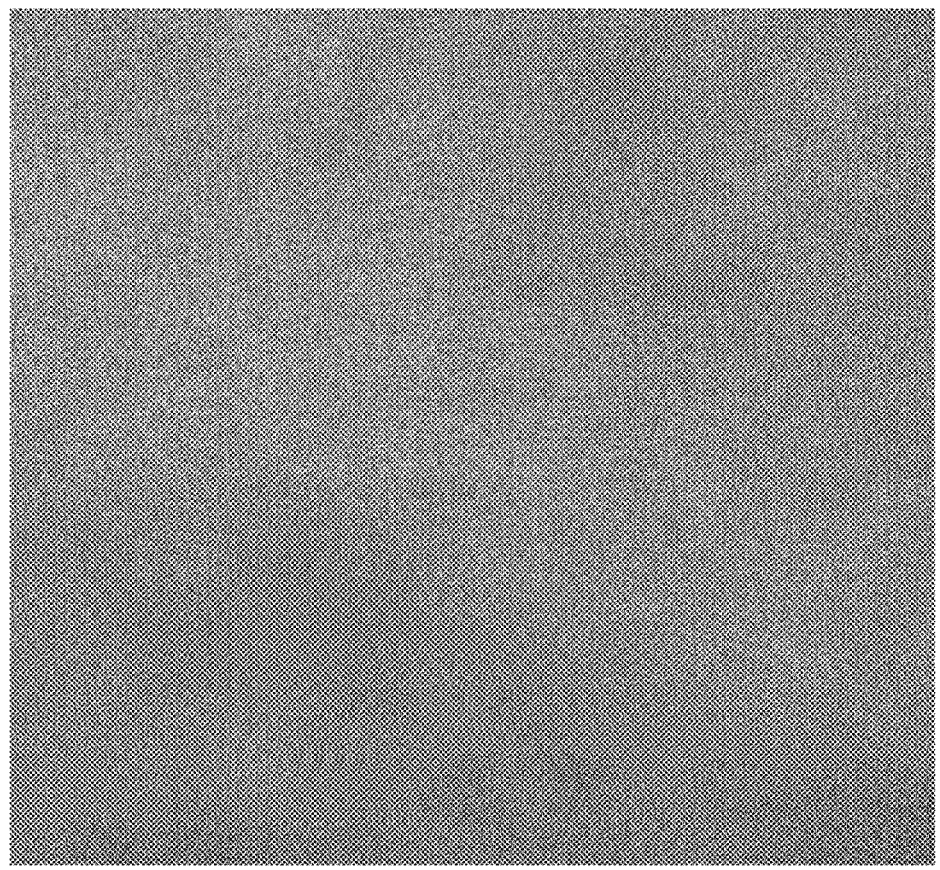

FIG. 2 is a flowchart showing the operation of the hand area detection unit 20 and the hand area normalization unit 30, shown in FIG. 1, and FIGS. 3 to 10 are diagrams employed in the description of FIG. 2.

First, the input unit 10 receives images of the back and/or the palm of the hand through the camera. Here, assuming that the user captures an image of the hand area while carrying a mobile phone in his or her hand, the image is captured at a distance of about 20 to 50 cm from the camera, and is received so that the image of the hand is located in the center of the image. Further, feature information appearing in the hand, which is desired to be detected in a subsequent stage, may be desirably extracted only when the hand area is captured with high quality. The camera for capturing the hand area may be implemented not only as basic cameras typically applied to mobile phones (or tablets) that are currently sold in markets, but also as three-dimensional (3D) depth cameras or stereoscopic cameras that are expected to be applied in the future. When such a camera is used, there are advantages in that the function of the hand area detection unit 20 may be more easily and precisely processed using 3D information and in that the hand area biometric information extraction unit (including the back-of-hand biometric information extraction unit 40 and the palm-of-hand biometric information extraction unit 50) may also easily extract and utilize the features of 3D shapes.

When the hand image is input in this way, the hand area detection unit 20 detects the hand area. The operation of detecting a hand area is described in detail with reference to the flowchart of FIG. 2.

In FIG. 2, when a hand image (see FIG. 3) is input, typical skin color-based hand area detection methods may be used. For example, a hand area is separated from a background using various binarization methods (see FIG. 4), such as a method for converting RGB signals into YCbCr signals and determining pixels I(x,y) satisfying a condition of Cbmin<I(x,y)<Cbmax, Crmin<I(x,y)<Crmax to be those of a skin color region, a method for detecting edge information from an image and determining a hand area by analyzing the edge information, or a method for segmenting the image into regions having the same color and separating a hand area at step S10.

When the background and the hand area are separated from each other, the procedure for verifying whether the separated hand area has a typical hand shape is performed at step S12. More specifically, whether the hand area has a shape including five fingers, the back of the hand, and a wrist is verified. When this verification procedure fails, it is determined that a hand area is not input, and the process returns to the initial step of receiving an image.

When the verification procedure succeeds, the hand area normalization unit 30 performs a hand area normalization procedure (including steps S14 to S24). In the hand area normalization procedure, in order to more accurately obtain the shape of the previously detected hand area, a portion of the region around the center point of the detected hand area is sampled and then the skin color (i.e. flesh color)(see FIG. 5) of the hand area suitable for the input environment is obtained at step S14. Thereafter, the hand area is more precisely re-binarized using the obtained skin color information at step S16. A method for searching for the center point of the binarized hand area may be implemented using information about average x and y coordinate values of the overall binarized area. Further, the method for utilizing skin color information about the hand area, which is obtained from the center point, is implemented using a method for supplementing existing skin color binarized information Cbmin, Cbmax, Crmin, and Crmax.

Figure 6:
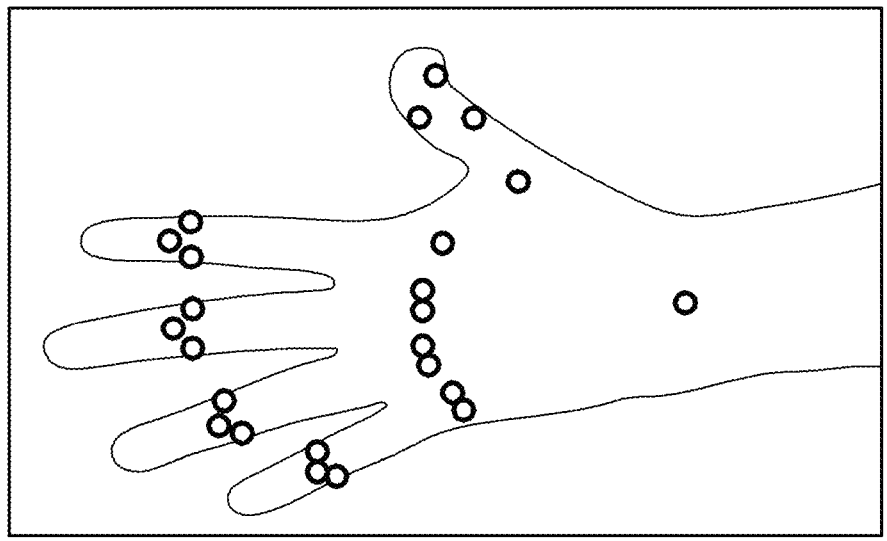

When the binarization of the hand area is completed, the edge of the binarized hand area is extracted, and positions at which sudden variation occurs in the extracted edge of the hand area are detected as major points of the hand at step S18. At this time, since the typical shape of the hand is well known, a scheme for defining the positions of respective elements in advance and searching for the major points of the hand is adopted so that the shape of the hand may be satisfactorily verified. In FIG. 6, the major points that are defined in advance can be seen. In an embodiment of the present invention, the positions of the major points are not limited to the positions illustrated in FIG. 6, but may be extended or reduced in the future depending on the circumstances.

Figure 7:
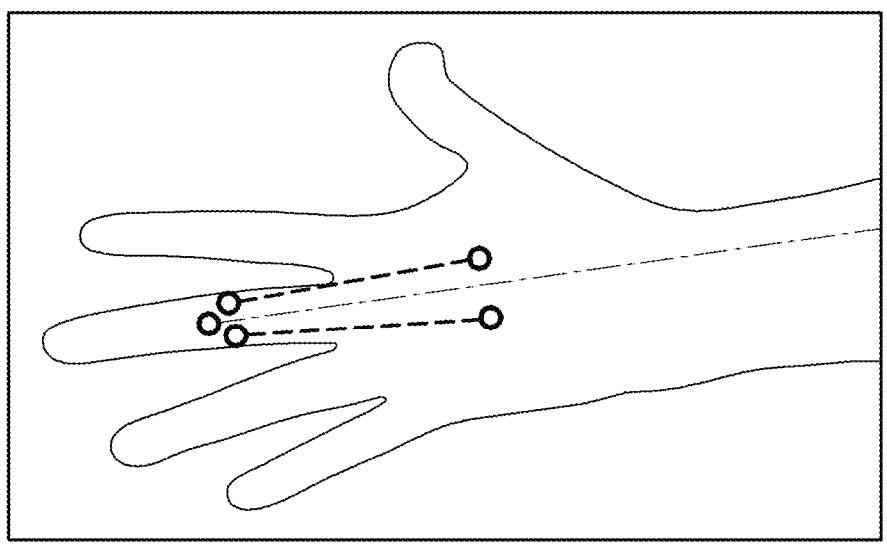

When the major points of the hand are detected, the middle finger and the centerline of the middle finger are detected at step S20. Since the shape of the hand and the major points of the hand are already well known, a centerline that longitudinally bisects the middle finger may be obtained using information about the major points constituting the middle finger, as shown in FIG. 7.

Figure 8:
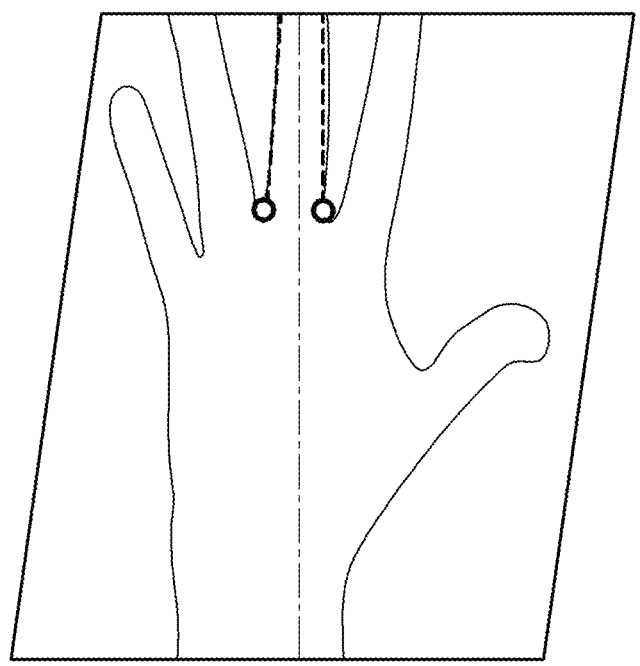

Next, as shown in FIG. 8, the image is rotated so that the middle finger is located in the center of the image, and thus the angle of rotation is normalized at step S22. Here, the angle of the middle finger may be normalized either horizontally or vertically, but the embodiment of the present invention illustrates a method whereby the middle finger is vertically normalized.

Figure 9:
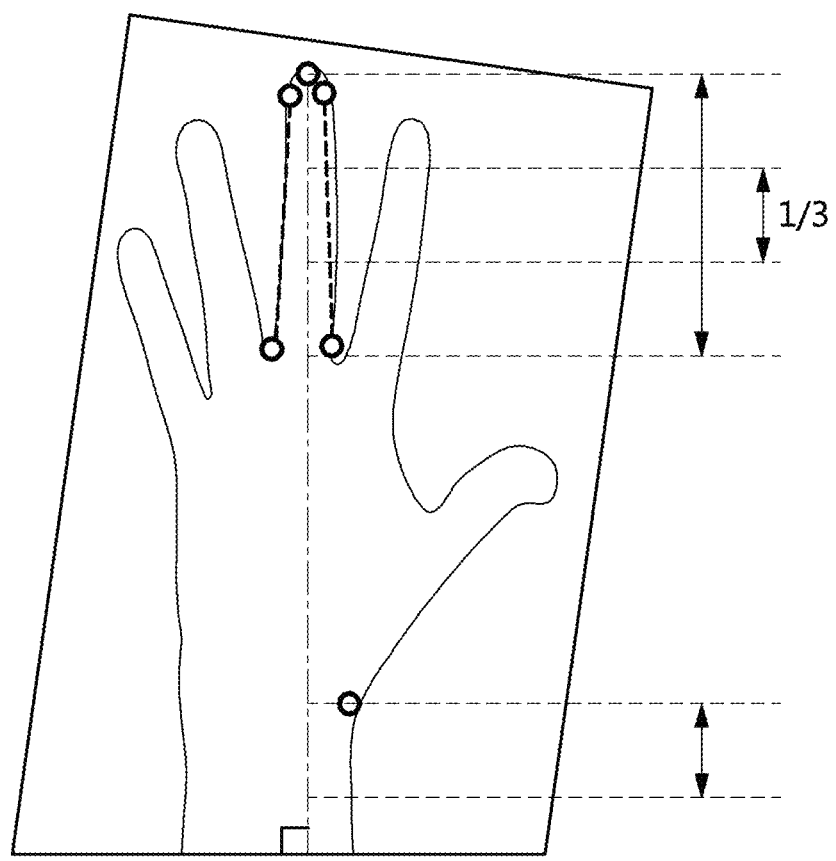
Figure 10:
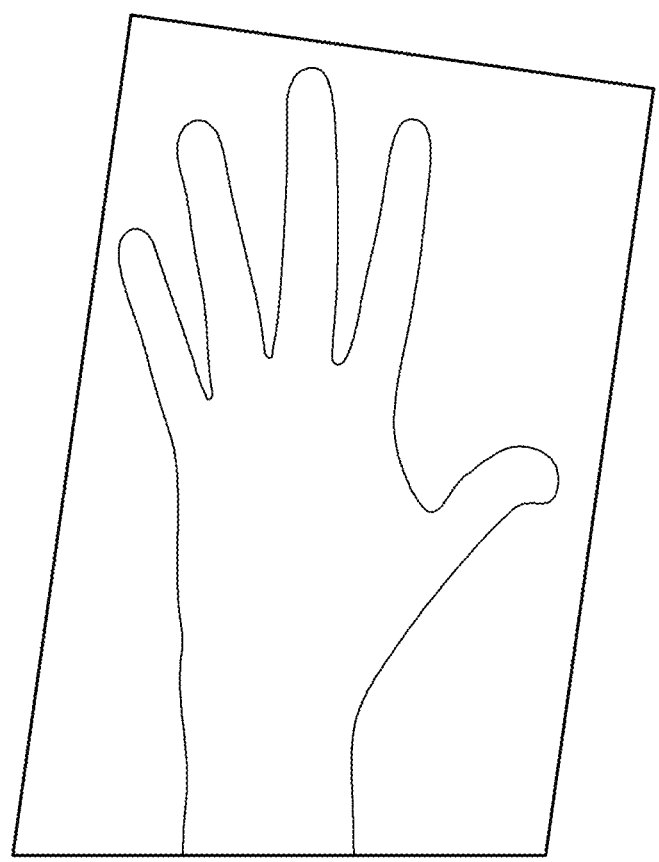

When the angle is normalized, normalization for cutting out a portion in the wrist region of the input image, corresponding to a predetermined length, is performed as the last step of normalization at step S24. For example, as shown in FIG. 9, the normalization size for the wrist region is obtained by extracting a portion corresponding to ⅓ of the length of the middle finger and by downwardly extending and cutting out a portion of the wrist region, corresponding to ⅓ length of the middle finger, from a starting portion of the wrist. The ultimately normalized hand area obtained in this way may be illustrated in FIG. 10. At this time, it should be noted that, when the image of the hand is captured with the fingers in a bent state, the lengths of the fingers are reduced. Therefore, before the lengths of the fingers are used, normalization for straightening the bent fingers using an image processing technique and thus obtaining accurate lengths of the fingers is required. The method of straightening the bent fingers may be implemented using an interpolation technique by analyzing the contour information of the hand and converting the contour of the hand from a curved line into a straight line.

Figure 11:
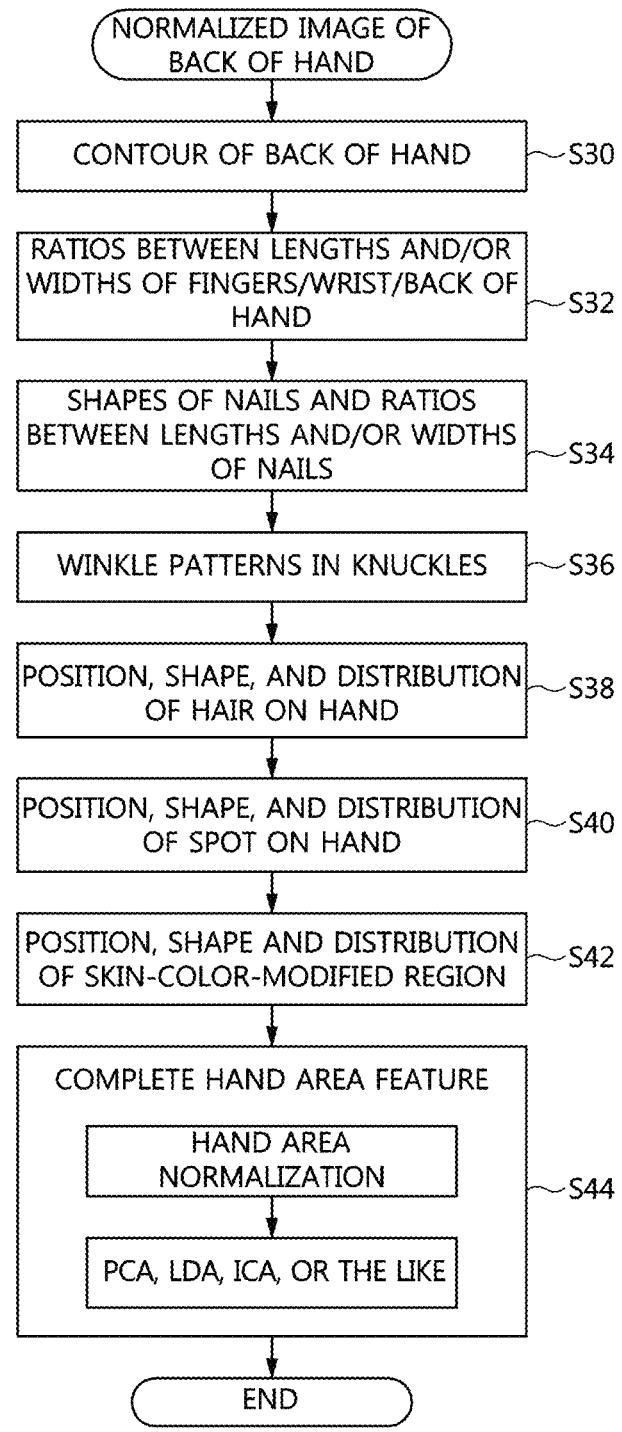
FIG. 11 is a flowchart showing the operation of the back-of-hand biometric information extraction unit shown in FIG. 1.

Below, the procedure whereby the back-of-hand biometric information extraction unit 40 and the palm-of-hand biometric information extraction unit 50 respectively extract the back-of-hand biometric information and the palm-of-hand biometric information based on the normalized hand area will be described. FIG. 11 is a flowchart showing the operation of the back-of-hand biometric information extraction unit shown in FIG. 1, and FIGS. 12 to 19 are diagrams employed in the description of FIG. 11.

The skin patterns in the normalized hand area are analyzed, whereby an image containing palm lines may be classified as an image of the palm of the hand and an image containing no palm lines may be classified as an image of the back of the hand. If an input image is an image of the back of the hand, the procedure for defining and extracting features corresponding to the back of the hand is performed, whereas if the input image is an image of the palm of the hand, the procedure for defining and extracting features corresponding to the palm of the hand is performed.

Figure 12:
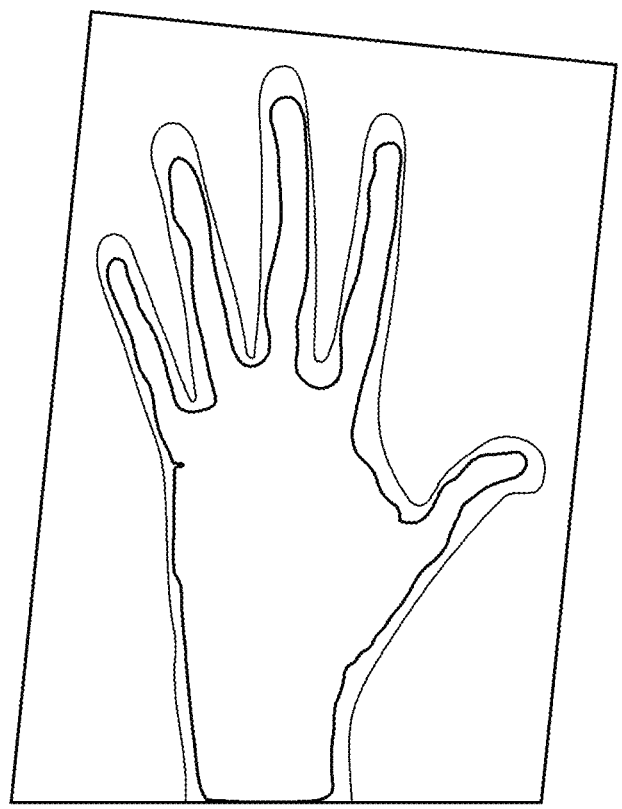
FIGS. 12 to 19 are diagrams employed in the description of FIG. 11.

First, when the input image is the image of the back of the hand, biometric information about the back of the hand is extracted by the back-of-hand biometric information extraction unit 40. In accordance with the flowchart of FIG. 11, a total of eight features may be extracted from the back of the hand in the embodiment of the present invention. Respective features have their own unique biometric information. The importance levels of respective features, indicated as weights W1 to W8, are combined with the features depending on how different the values obtained from the backs of the hands are, how high the extraction accuracy is, etc., for respective persons, and then the resulting features are utilized in a final authentication module (i.e. the hand biometric information registration and authentication unit 60). That is, the biometric features of the back of the hand may be merged into unique biometric information of respective persons using the following equation:

PersonHandBack=HandBack_Contour*$W1$+
HandBack_LengthRate*$W2$+
HandBack_Nail*$W3$+
HandBack_Finger_Joint*$W4$+
HandBack_Hair*$W5$+HandBack_Spot*$W6$+
HandBack_SkinNoise*$W7$+
HandBack_SkinFullRegion* $W8$ First, the contour of the back of the hand (HandBack_Contour) is extracted at step S30. In the above equation, the feature for the contour of the back of the hand (HandBack_Contour) refers to the feature of hand contour information, as shown in FIG. 12. Each person has a unique contour, from which unique biometric information may be acquired.

Figure 13:
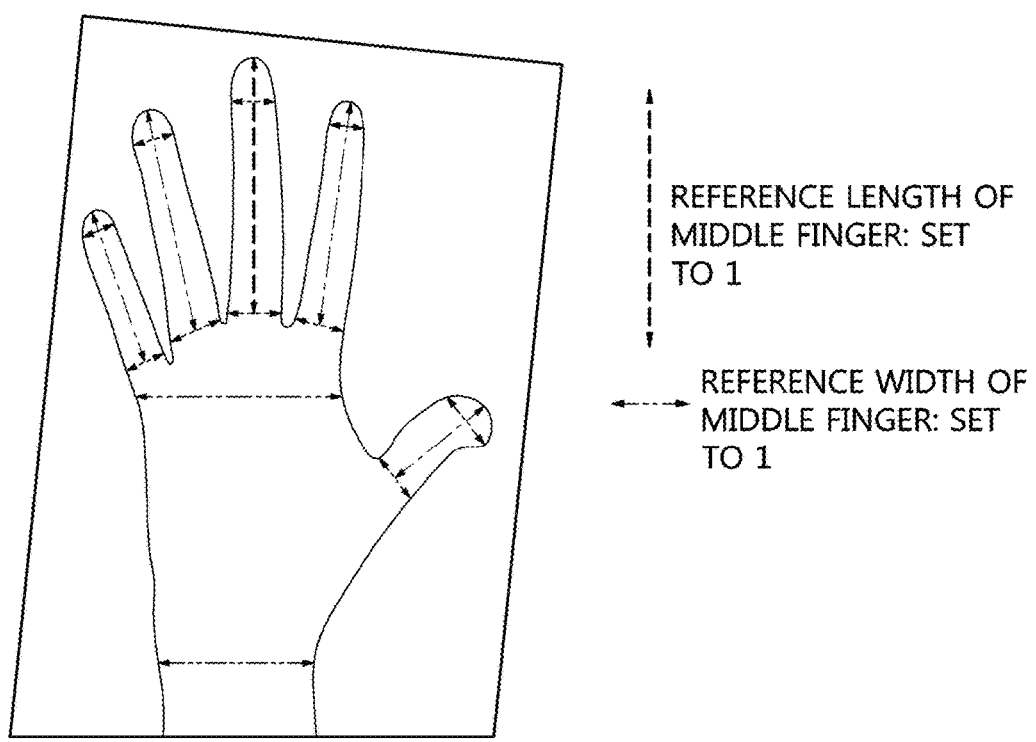

Further, the ratios between the lengths and/or between the widths of the fingers and the back of the hand (HandBack_LengthRate) is acquired by normalizing the length of the middle finger as "1" and extracting, as features, the ratios between the lengths of the other fingers, the wrist, and the back of the hand, which are proportional to the length of the middle finger, at step S32. In an embodiment of the present invention, all of the ratios between the lengths of regions, which differ from each other for respective persons and exist in the hand area, as well as the ratios between lengths illustrated in FIG. 13, are utilized.

Figure 14:
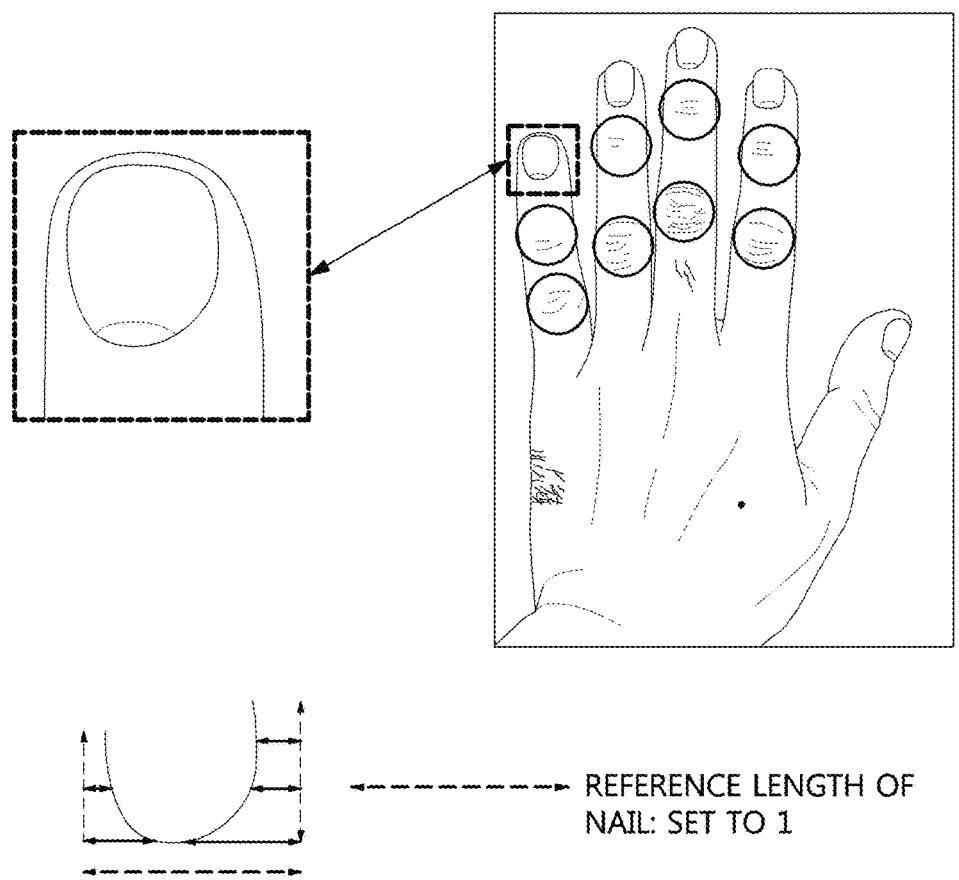

Furthermore, the shapes and the ratios between the lengths and/or between widths of nails, existing in fingers (HandBack_Nail), are extracted as unique biometric features at step S34. In FIG. 14, the method for extracting the shapes and the ratios between the lengths and/or between widths of nails of the respective fingers, as unique biometric features (HandBack_Nail), is illustrated. In the case of women, since artificial nails having various shapes may be attached to real nails, the contours of the nails, rather than the internal shapes thereof, and the widths and lengths of the nails may be utilized as features.

Figure 15:
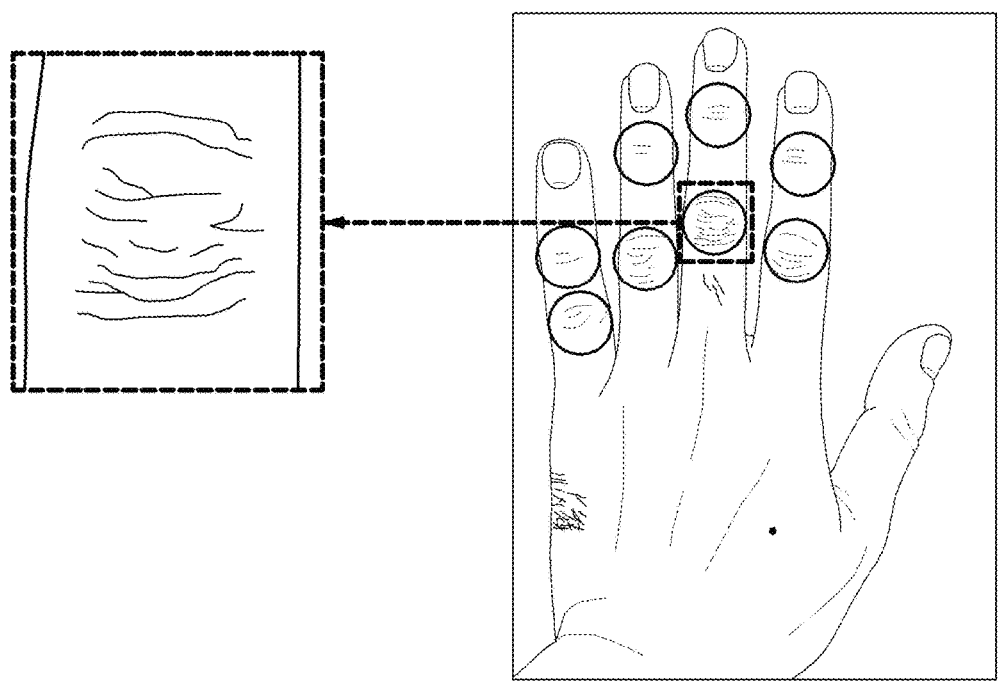

Furthermore, wrinkle patterns appearing on respective knuckles (HandBack_Finger_Joint) are extracted as features at step S36. In FIG. 15, the method for extracting wrinkle patterns appearing on the knuckles (HandBack_Finger_Joint) as features is illustrated. Wrinkle patterns appearing on respective knuckles are unique for respective persons, and the features required to authenticate human beings may be extracted if these patterns are accurately analyzed.

Figure 16:
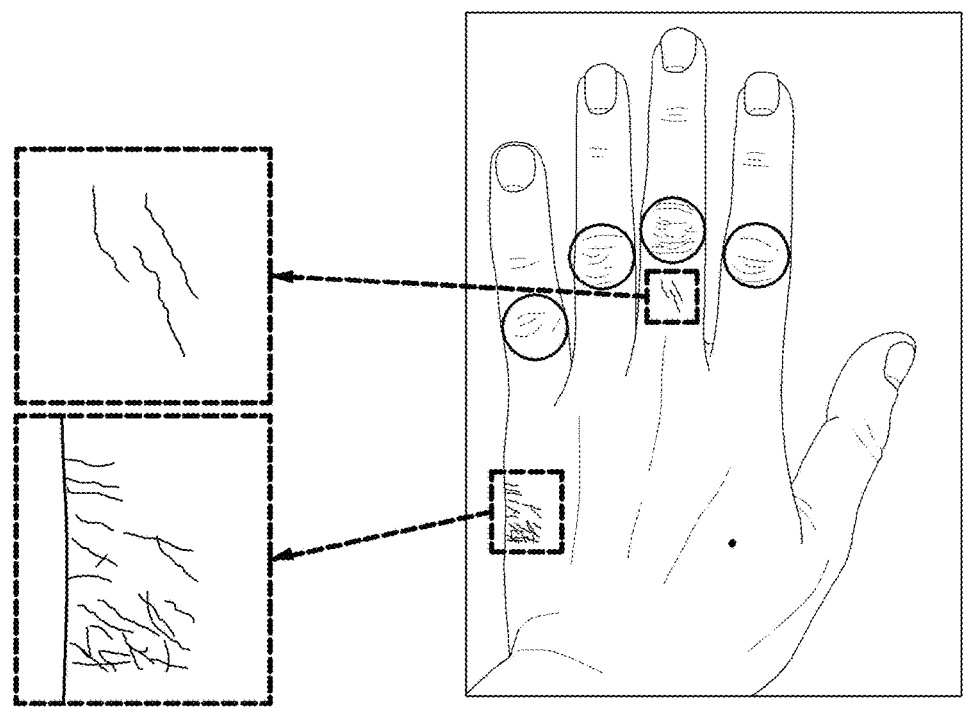

In addition, the shapes and distributions of hairs in specific regions of the fingers and the back of the hand are extracted as features (HandBack_Hair) at step S38. In FIG. 16, the method for utilizing the shapes and distributions of hairs in specific regions of the fingers and the back of the hand as the features (HandBack_Hair) is illustrated. Respective persons have hairs at specific positions and the distributions and shapes of respective hairs have unique features. The embodiment of the present invention extracts and uses information about such hairs as unique biometric information. The embodiment of the present invention may utilize the positions of hairs in the complete area of the back of the hand, enabling individuals to be identified without being limited to the positions defined in FIG. 16.

Figure 17:
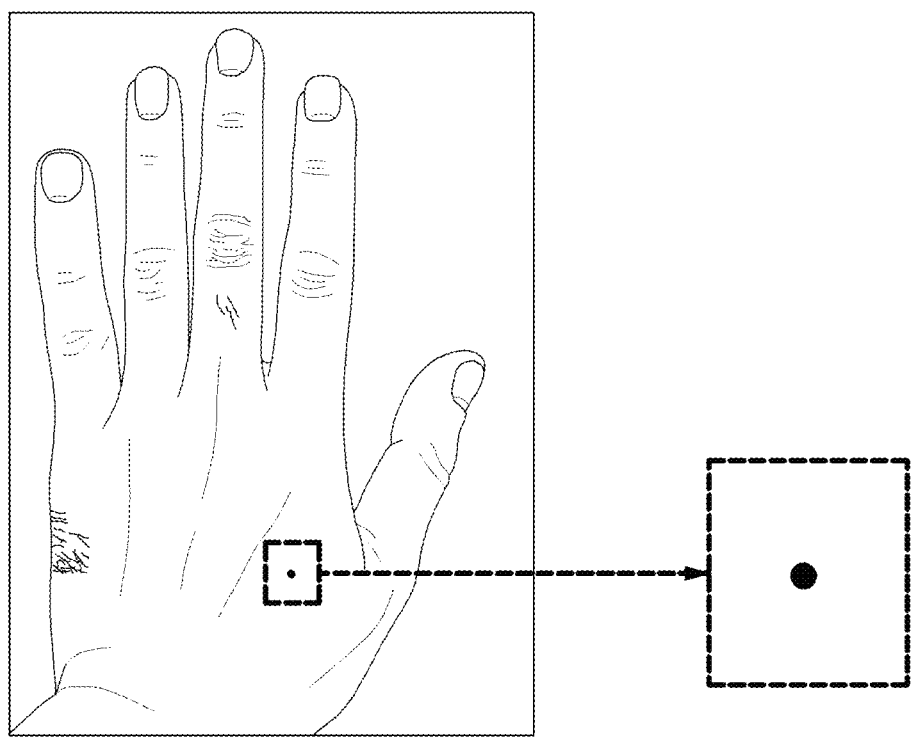

Next, the size and shape of a specific spot (or a mole) formed on the hand (HandBack_Spot) are extracted as features at step S40. In FIG. 17, the method for defining the size and shape of a specific spot, formed on the hand, as a feature (HandBack_Spot) is illustrated. Unique spots may exist at specific positions for respective persons, and may have colors differing from the skin color, and thus such spots may be detected using an image processing technique. The sizes and positions of the detected spots may be used as unique biometric information that enables individuals to be identified.

Figure 18:
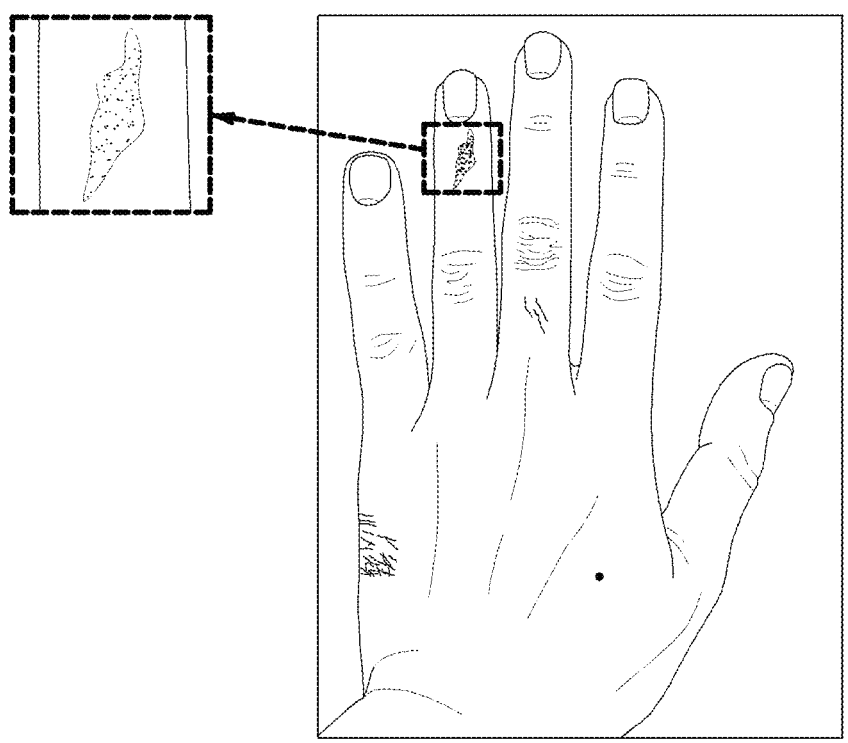

In addition, the position of a skin-color-modified region (HandBack_SkinNoise) is extracted as a feature at step S42. FIG. 18 illustrates the results of extracting the position of the region in which a skin color is modified due to a scar or a cut, rather than a spot, that is, the skin-color-modified region (HandBack_SkinNoise), as a feature. Similar to spots, the position and shape of skin-color-modified regions having colors different from the skin color may be significant feature information that enables individuals to be identified.

Figure 19:
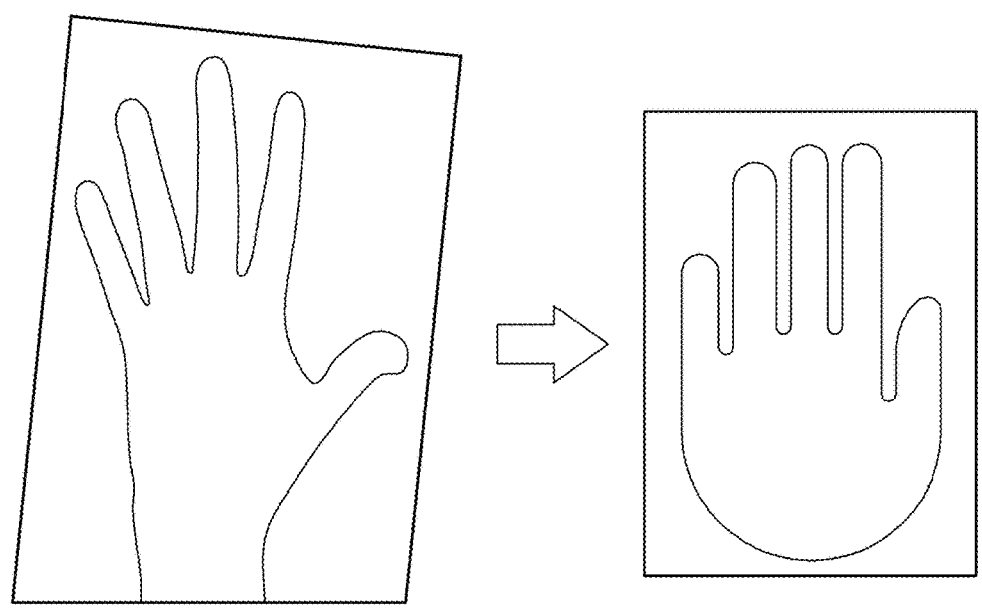

Thereafter, the feature of a complete skin-color region (HandBack_SkinFullRegion) constituting the hand area is extracted at step S44. In FIG. 19, the method for utilizing the feature of the complete skin-color region (HandBack_SkinFullRegion) constituting the hand area as feature information required to identify each individual is illustrated. The previously extracted features are acquired by extracting the local features from individual regions of the back of the hand. However, the complete hand area feature information (HandBack_SkinFullRegion) is used to present a method for mapping the complete hand area to a single standard hand shape, and statistically extracting features by applying a technique such as Principal Component Analysis (PCA) to the distribution of complete skin information in a standard region. In the embodiment of the present invention, the method of statistically extracting features is not limited to a specific technique, such as the exemplified PCA, Independent Component Analysis (ICA) or Linear Correlation Analysis (LDA) technique, but any type of available statistical method that is used in existing pattern recognition may be used.

Figure 20:
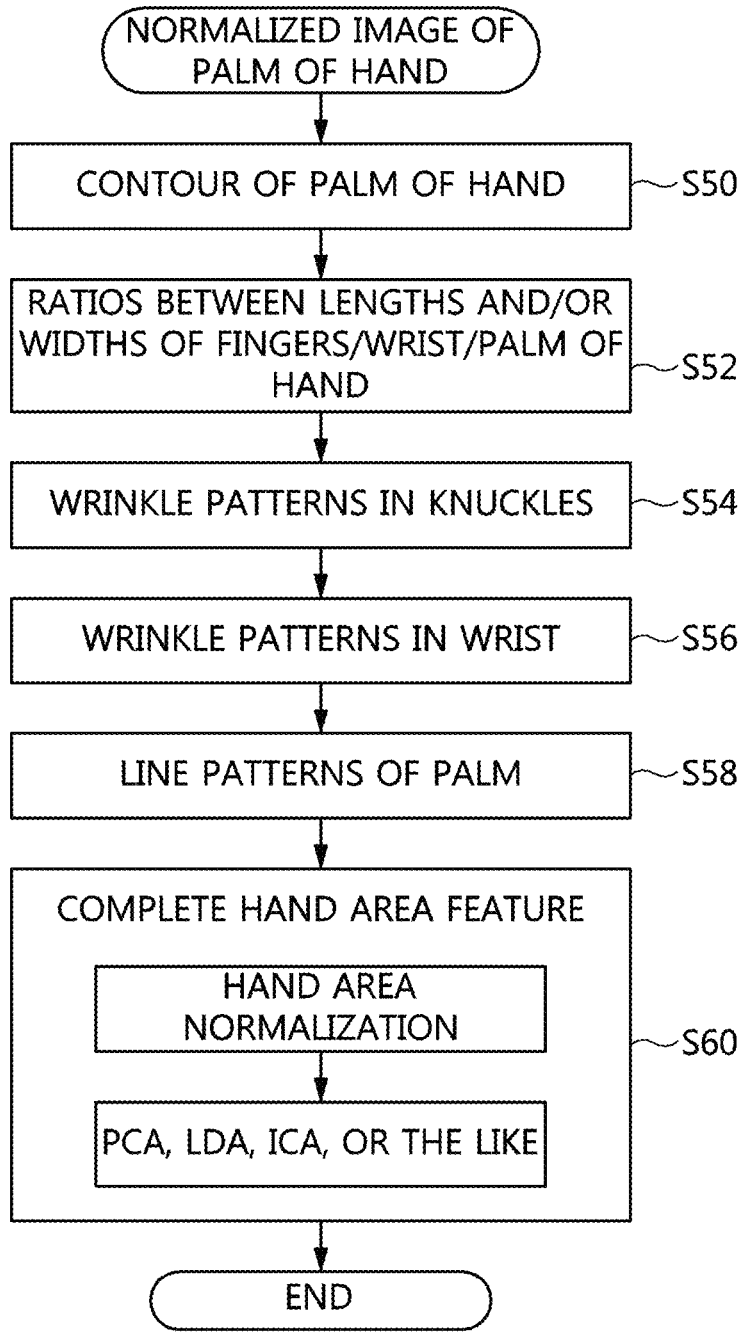
FIG. 20 is a flowchart showing the operation of the palm-of-hand biometric information extraction unit, shown in FIG. 1.

Meanwhile, as described above, when an image of the palm of the hand is received as an input image, an operation of extracting biometric information about the palm of the hand is performed by the palm-of-hand biometric information extraction unit 50. FIG. 20 is a flowchart showing the operation of the palm-of-hand biometric information extraction unit 50 shown in FIG. 1, and FIGS. 21 to 26 are diagrams employed in the description of FIG. 20.

Figure 21:
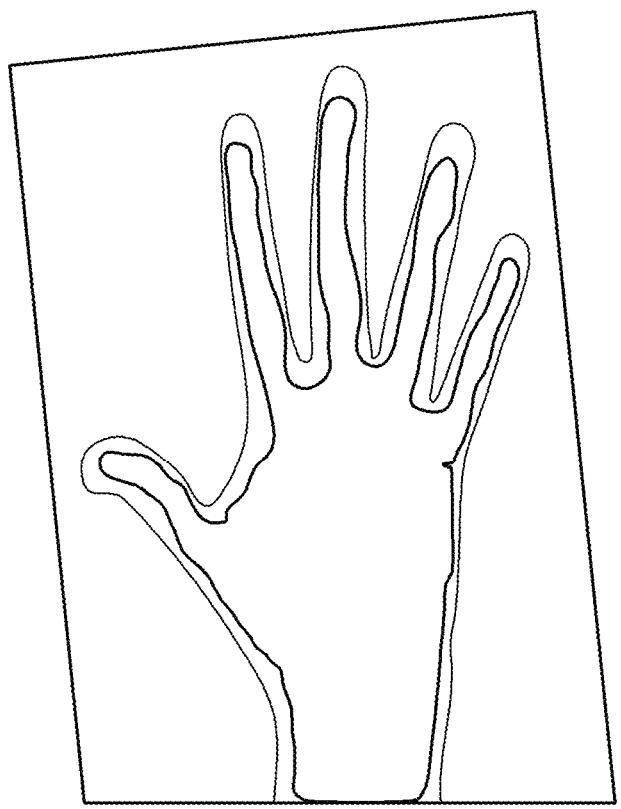
FIGS. 21 to 26 are diagrams employed in the description of FIG. 20.
Figure 22:
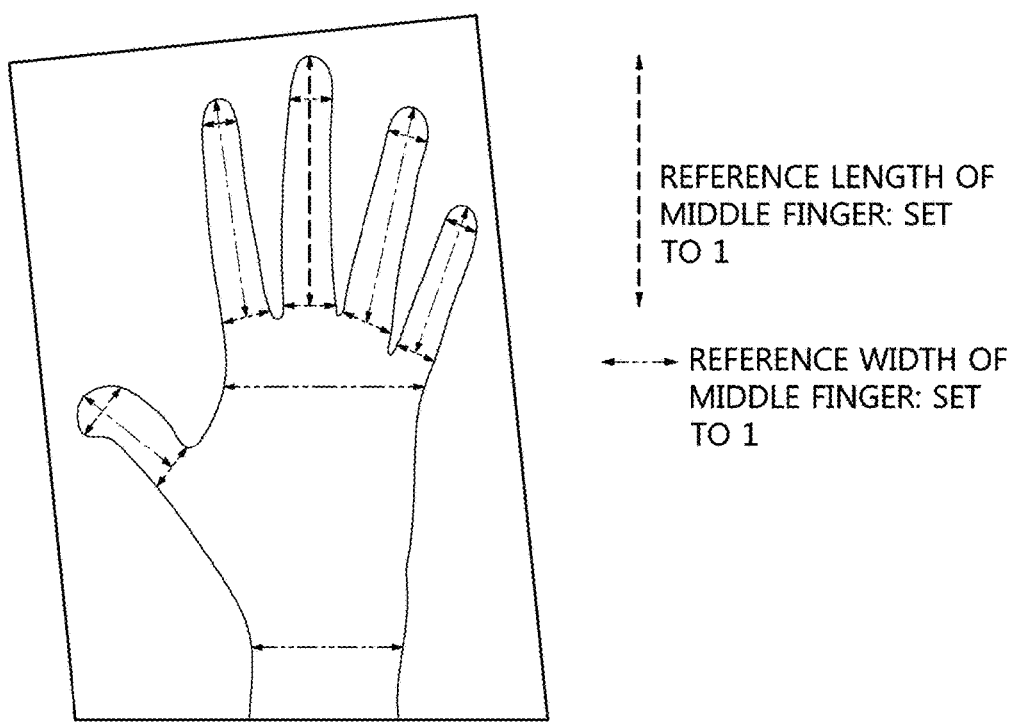

Referring to the flowchart of FIG. 20, the embodiment of the present invention may extract a total of six features from the palm of the hand. Like the features of the back of the hand, the respective features of the palm of the hand have their own unique values. The importance levels of respective features, indicated as weights W1 to W6, are combined with the features depending on how different the values actually obtained from the palms of the hands are, how high the extraction accuracy is, etc., for respective persons, and the resulting features are utilized in authentication. That is, the features may be merged into the unique biometric information of respective persons by the following equation:

PeronHandPalm=HandPalm_Contour*$W1$+
HandPalm_Length_Rate*$W2$+
HandPalm_Finger_Joint_Print*$W3$+
HandPalm_Wrist_Print*$W4$+
HandPalm_Line*$W5$+
HandPalm_SkinFullRegion*$W6$ First, features, such as the contour of the palm of the hand (HandPalm_Contour) and the ratios between the lengths and/or between the widths of the fingers/wrist/palm of the hand (HandPalm_Length_Rate), are extracted at steps S50 and S52. Methods for extracting the contour of the palm of the hand (HandPalm_Contour) and the ratios between the lengths and/or between the widths of the fingers/wrist/palm of hand (HandPalm_Length_Rate), as described in FIGS. 21 and 22, are identical to the above-described methods for extracting the feature information from the back of the hand.

Figure 23:
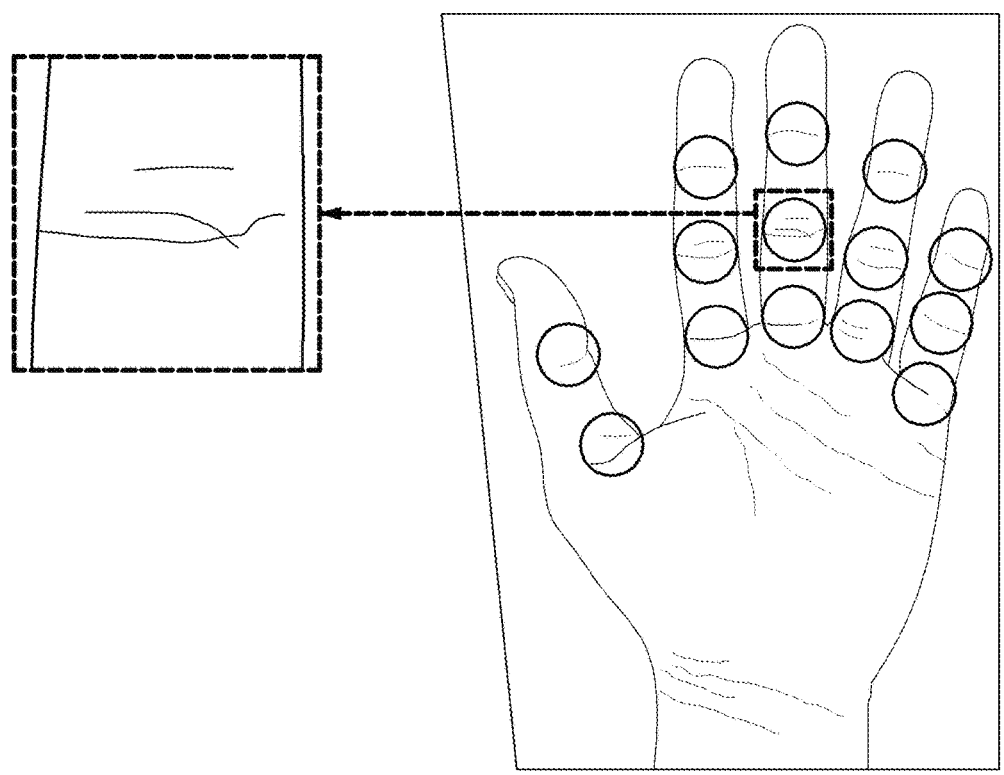

Further, wrinkle patterns (HandPalm_Finger_Joint_Print) in the knuckles are extracted at step S54. In FIG. 23, the extraction of features using the shapes of wrinkle patterns in the knuckles (HandPalm_Finger_Joint_Print) is illustrated. Respective persons have unique wrinkle pattern shapes in the knuckles, similar to fingerprints.

Figure 24:
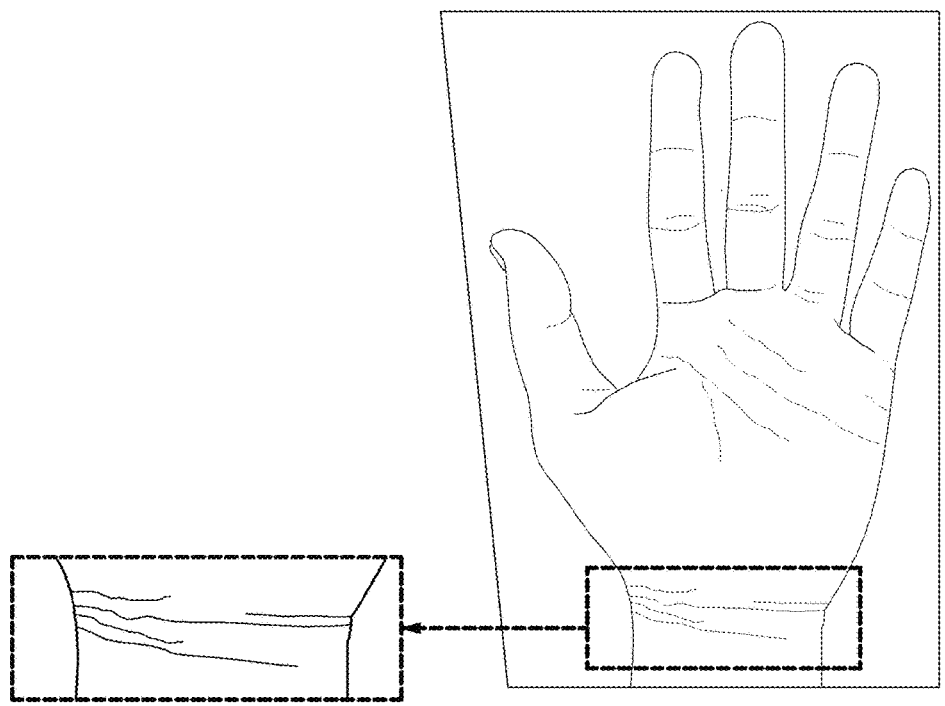

Furthermore, wrinkle patterns in the wrist (HandPalm_Wrist_Print) are extracted at step S56. In FIG. 24, the extraction of features using wrinkle patterns in the wrist (HandPalm_Wrist_Print) is illustrated. Respective persons have unique wrinkle patterns in their wrists, which are extracted as features using an image processing technique.

Figure 25:
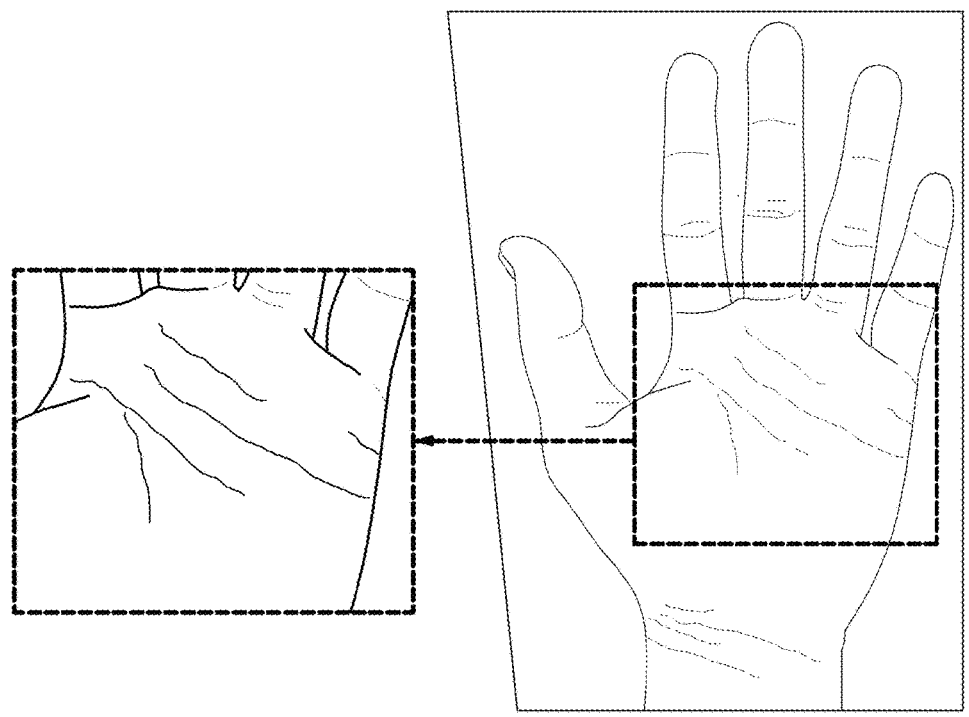

Further, the lines in a palm line area of the palm of the hand are extracted as features using an image processing technique at step S58. In FIG. 25, the results of extracting lines from a palm line area of the palm of the hand, which is generally and widely used, using an image processing technique are illustrated. User authentication using the palm lines has also been used in existing research or patents, and thus it may not be included in the scope of the present invention to be claimed.

Figure 26:
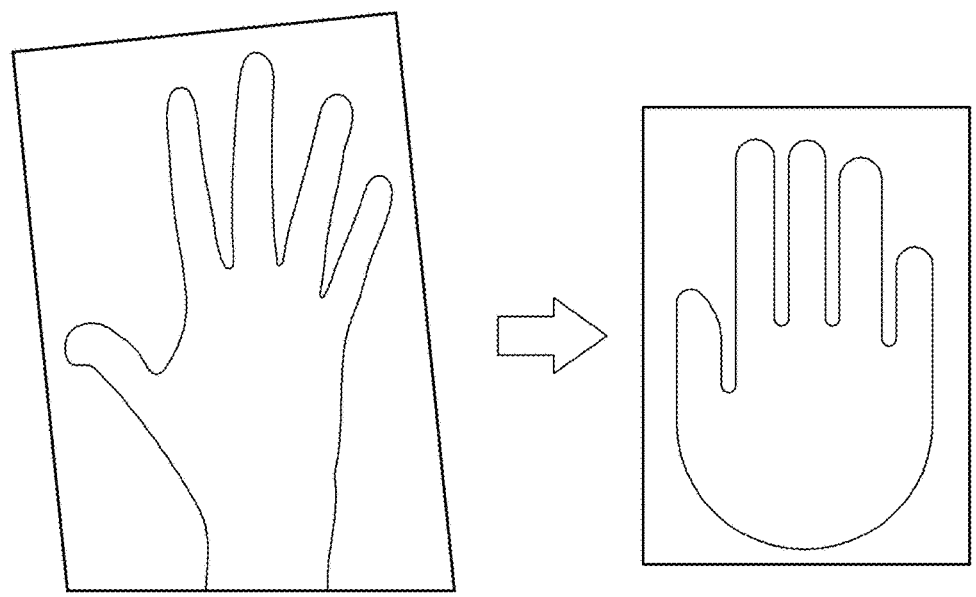

Finally, the statistical features of the complete skin-color region forming the palm of the hand (HandPalm_SkinFullRegion) are extracted at step S60. In FIG. 26, the method of utilizing the statistical features of the complete skin-color region forming the palm of the hand (HandPalm_SkinFullRegion) as feature information for identifying individuals is illustrated. This method is identical to the above-described feature extraction method for the back of the hand, except that the features are extracted from the palm of the hand rather than from the back of the hand.

As described above, unique biometric information about each person may be acquired from the back of the hand and the palm of the hand of the corresponding person.

For higher precision and the importance of security, the hand biometric information registration and authentication unit 60 may add information about the back of the hand and the palm of the hand to each other, as given in the following equation, and may utilize the added information for personal authentication. However, when convenience of usage has higher priority than the importance of security, authentication may be attempted using only one of the back of the hand and the palm of the hand.

PersonID=PersonHandBack+PersonHandPalm

When personal authentication is attempted using biometric information in the hand area, pulse information may be extracted if variation in the skin color of the hand area is observed for a predetermined period of time, in preparation for the situation in which biometric information is forged using false biometric information (rubber, silicon, gelatin, or the like). Accordingly, in an embodiment of the present invention, when an image is input to observe variation in the skin color of a hand area, a scheme for receiving multiple frames during a period of 1 to 3 seconds, during which a pulse can be extracted, rather than a single frame, is proposed. Further, when multiple frames, rather than a single frame, are received, the advantage of more precisely extracting pieces of biometric feature information from the multiple frames is present, but the disadvantage of increased extraction time may also be present.

Figure 27:
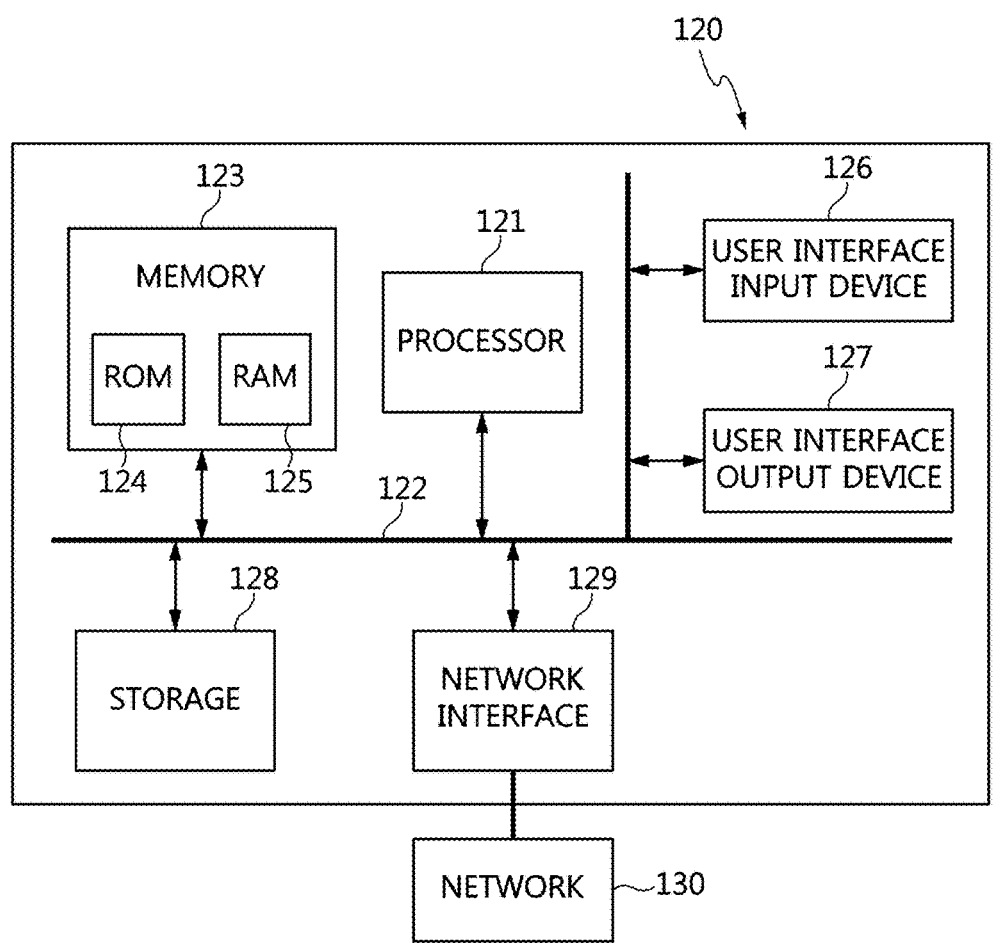
FIG. 27 is a diagram showing a computer system in which the embodiment of the present invention is implemented.

Meanwhile, the embodiment of the present invention may be implemented in a computer system. As shown in FIG. 27, a computer system 120 includes one or more processors 121, memory 123, a user interface input device 126, a user interface output device 127, and storage 128, which communicate with each other through a bus 122. The computer system 120 may further include one or more network interfaces 129 connected to a network 130. Each processor 121 may be a Central Processing Unit (CPU) or a semiconductor device for executing processing instructions stored in the memory 123 or the storage 128. Each of the memory 123 and the storage 128 may be any of various types of volatile or nonvolatile storage media. For example, the memory 123 may include Read Only Memory (ROM) 124 or Random Access Memory (RAM) 125.

Further, when the computer system 120 is implemented in a small-sized computing device in preparation for the Internet of Things (IoT) age, if an Ethernet cable is connected to the computing device, the computing device may function as a wireless sharer, so that a mobile device may be coupled in a wireless manner to a gateway to perform encryption/decryption functions. Therefore, the computer system 120 may further include a wireless communication chip (WiFi chip) 131.

Therefore, the embodiment of the present invention may be implemented as a non-temporary computer-readable storage medium in which a computer-implemented method or computer-executable instructions are recorded. When the computer-readable instructions are executed by a processor, the instructions may perform the method according to at least one aspect of the present invention.

In accordance with the present invention having the above configuration, the shape of a registered user's hand may be acquired and the identity of the user may be verified using a typical mobile IT device equipped with a camera, without requiring a special input device.

In this case, the present invention may enable more convenient input of biometric information than when using a facial image, does not require a special input device such as that used for fingerprint recognition, and is resistant to falsified biometric information thanks to the processing of video. That is, unique biometric features, such as the hand shapes of respective persons, may be easily acquired, accurate authentication results may be obtained, and high information security may be realized because it is more difficult to imitate or forge information than when using other types of biometric information.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:
1. A user authentication apparatus, comprising:
one or more processors that process computer executable program code embodied in computer readable non-transitory storage media, the computer executable program code comprising:
hand area detection program code that detects a hand area from an input hand image;
hand area normalization program code that binarizes the detected hand area and that normalizes the binarized hand area;

hand biometric information extraction program code that extracts unique hand biometric information from the normalized hand area, the unique hand biometric information comprising ratios of hand characteristics; and hand biometric information registration and authentication program code that registers the extracted hand biometric information and that authenticates the corresponding user based on the registered hand biometric information, wherein the registered hand biometric information is based upon a combination of both back-of-hand biometric information and palm-of-hand biometric information, and wherein the hand area normalization program code that normalizes the angle of the image by rotating the image that the middle finger of the major points of the hand detected based on binarization is located in the center of the image and that normalizes the size of the wrist by downwardly extending and cutting out a portion of the wrist region, corresponding to ⅓ length of the middle finger, from a starting portion of the wrist.

2. The apparatus of claim 1, wherein the hand area detection program code detects the hand area based on a color of a skin.

3. The apparatus of claim 1, wherein the hand area normalization program code further comprises:

program code that acquires the skin color by sampling a portion of a region around a center point of the detected hand area, and program code that detects major points of the hand from an edge of the binarized hand area.

4. The apparatus of claim 1, wherein the hand biometric information extraction program code extracts biometric information about the back of the hand and biometric information about the palm of the hand as hand biometric information.

5. The apparatus of claim 4, wherein the hand biometric information extraction program code further comprises:

program code that analyzes skin patterns in the normalized hand area, and program code that classifies an image containing no palm lines as an image of the back of the hand.

6. The apparatus of claim 5, wherein the hand biometric information extraction program code further comprises program code that extracts, based on the image of the back of the hand, one or more of a contour of the hand, ratios between lengths and/or widths of the fingers, a wrist, and the back of the hand, shapes of nails and ratios between the lengths and/or widths of the nails, wrinkle patterns in knuckles, a position, shape, and distribution of hair on the hand, a position, shape and distribution of spots, a position, shape, and distribution of a skin-color-modified region, and a complete skin-color region forming the hand area, as biometric information about the back of the hand.

7. The apparatus of claim 4, wherein the biometric information about the back of the hand is combined with respective weights.

8. The apparatus of claim 4, wherein the hand biometric information extraction program code analyzes the skin pattern of the normalized hand area and classifies an image having palm lines as an image of the palm of the hand.

9. The apparatus of claim 8, wherein the hand biometric information extraction program code further comprises program code that extracts, based on the image of the palm of the hand, one or more of a contour of the hand, ratios between lengths and/or widths of the fingers, a wrist, and the palm of the hand, wrinkle patterns in knuckles, wrinkle patterns in the wrist, line patterns in a palm line area, and a complete skin-color region forming the hand area, as the biometric information about the palm of the hand.

10. The apparatus of claim 9, wherein the biometric information about the palm of the hand is combined with respective weights.

* * * * *